(12) United States Patent
Lee

(10) Patent No.: US 11,339,837 B2
(45) Date of Patent: May 24, 2022

(54) TWO-MODE ROCKER CLUTCH

(71) Applicant: Schaeffler Technologies AG & Co. KG, Herzogenaurach (DE)

(72) Inventor: Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/069,283

(22) Filed: Oct. 13, 2020

(65) Prior Publication Data

US 2022/0112926 A1    Apr. 14, 2022

(51) Int. Cl.
| F16D 41/12 | (2006.01) |
| F16D 41/16 | (2006.01) |
| F16D 41/08 | (2006.01) |
| F16D 41/14 | (2006.01) |
| F16D 27/102 | (2006.01) |

(52) U.S. Cl.
CPC ........... *F16D 41/16* (2013.01); *F16D 41/084* (2013.01); *F16D 41/14* (2013.01); *F16D 27/102* (2013.01)

(58) Field of Classification Search
CPC ......... F16D 41/14; F16D 41/16; F16D 27/102
See application file for complete search history.

(56) References Cited

U.S. PATENT DOCUMENTS

| 5,992,592 | A | 11/1999 | Showalter |
| 7,258,214 | B2 | 8/2007 | Pawley et al. |
| 7,721,860 | B2 * | 5/2010 | Saka .................. F16D 41/16 |
| | | | 192/43.1 |
| 8,042,669 | B2 | 10/2011 | Samie et al. |
| 9,995,369 | B2 * | 6/2018 | Tachibanada ........... F16H 61/18 |
| 10,145,467 | B2 * | 12/2018 | Tachibanada ........... F16D 41/14 |
| 10,393,154 | B2 * | 8/2019 | Mukai .................... F16D 41/16 |
| 10,563,679 | B2 * | 2/2020 | Tachibanada .......... F16D 41/16 |
| 10,563,732 | B2 * | 2/2020 | Shibamura ............... F16H 3/66 |
| 10,584,725 | B2 * | 3/2020 | Shimazaki .......... F15B 15/2807 |
| 10,612,571 | B2 * | 4/2020 | Mukai .................... F16D 41/14 |
| 10,641,392 | B2 * | 5/2020 | Shimazaki .......... F16H 63/3483 |
| 10,641,393 | B2 * | 5/2020 | Yamagishi ............. F16D 41/16 |
| 10,753,379 | B2 * | 8/2020 | Shimazaki ............. F16D 41/14 |

(Continued)

FOREIGN PATENT DOCUMENTS

| JP | 2008-544172 A | 12/2008 |
| WO | 2009/132056 A2 | 10/2009 |

*Primary Examiner* — David R Morris
(74) *Attorney, Agent, or Firm* — Volpe Koenig

(57) ABSTRACT

A two-mode rocker clutch, including: a clutch gear; a housing; a first pawl including an end and a portion disposed within the housing; an actuation assembly; a second pawl including a portion disposed within the housing; and a resilient element urging the second pawl into contact with the clutch gear. For a one-way mode, the clutch gear is rotatable, with respect to the housing, only in a first circumferential direction. To transition from the one-way mode to a locked mode: the second pawl blocks rotation of the clutch gear, with respect to the housing, in a second circumferential direction, opposite the first circumferential direction; the actuation assembly is arranged to pivot the first pawl into contact with the clutch gear; and the end of the first pawl is arranged to block rotation of the clutch gear, with respect to the housing, in the first circumferential direction.

17 Claims, 6 Drawing Sheets

(56) References Cited

U.S. PATENT DOCUMENTS

| | | | |
|---|---|---|---|
| 2008/0000747 A1* | 1/2008 | Saka | F16D 41/125 |
| | | | 192/43.2 |
| 2014/0102844 A1* | 4/2014 | Greene | F16D 41/16 |
| | | | 192/45.1 |
| 2017/0268634 A1* | 9/2017 | Tachibanada | F16D 41/125 |
| 2017/0268663 A1* | 9/2017 | Tachibanada | F16D 41/16 |
| 2018/0094676 A1 | 4/2018 | Campton et al. | |
| 2018/0266450 A1* | 9/2018 | Mukai | F16H 63/3023 |
| 2018/0266451 A1* | 9/2018 | Shimazaki | F16D 41/125 |
| 2018/0266555 A1* | 9/2018 | Shimazaki | B60T 1/005 |
| 2018/0274633 A1* | 9/2018 | Shibamura | F16H 37/0826 |
| 2018/0283415 A1* | 10/2018 | Shimazaki | F16H 63/3483 |
| 2018/0283416 A1* | 10/2018 | Mukai | F16H 63/3483 |
| 2018/0283419 A1* | 10/2018 | Tachibanada | F15B 15/14 |
| 2018/0283550 A1* | 10/2018 | Yamagishi | F16D 41/14 |
| 2018/0328419 A1* | 11/2018 | Hand | F16D 41/14 |
| 2019/0226533 A1 | 7/2019 | Cioc et al. | |
| 2020/0240480 A1 | 7/2020 | Hodge et al. | |

\* cited by examiner

US 11,339,837 B2

TWO-MODE ROCKER CLUTCH

TECHNICAL FIELD

The present disclosure relates to a rocker clutch switchable between a one-way mode and a locked mode.

BACKGROUND

Known ratcheting clutch can lack desired functionality.

SUMMARY

According to aspects illustrated herein, there is provided a two-mode rocker clutch, including: a clutch gear supported for rotation around an axis of rotation; a housing; a first pawl including an end and a portion disposed within the housing; an actuation assembly; a second pawl including a portion disposed within the housing; and a resilient element urging the second pawl into contact with the clutch gear. For a one-way mode of the two-mode rocker clutch, the clutch gear is rotatable, with respect to the housing, only in a first circumferential direction around the axis of rotation. To transition from the one-way mode to a locked mode of the two-mode rocker clutch: the second pawl blocks rotation of the clutch gear, with respect to the housing, in a second circumferential direction, opposite the first circumferential direction; the actuation assembly is arranged to pivot the first pawl into contact with the clutch gear; and the end of the first pawl is arranged to block rotation of the clutch gear, with respect to the housing, in the first circumferential direction.

According to aspects illustrated herein, there is provided a two-mode rocker clutch, including: a clutch gear supported for rotation around an axis of rotation; a housing; a first pawl including an end and a portion disposed within the housing; a second pawl free of contact with the first pawl and including a portion disposed within the housing; a first resilient element; and a second resilient element urging the second pawl into contact with the clutch gear. In a one-way mode of the two-mode clutch: the clutch gear is rotatable, with respect to the housing, only in first circumferential direction around the axis of rotation; and the second pawl is arranged to block rotation of the clutch gear, with respect to the housing, in a second circumferential direction, opposite the first circumferential direction. In a locked mode of the two-mode rocker clutch, rotation of the clutch gear, with respect to the housing, is blocked by the first pawl and the second pawl. To transition from the one-way mode to the locked mode, the first resilient element is arranged to pivot the first pawl into contact with the clutch gear.

According to aspects illustrated herein, there is provided a method of operating a two-mode rocker clutch including a clutch gear, a housing, a first pawl at least partially disposed in the housing, a first resilient element, a second pawl at least partially disposed in the housing, and a second resilient element at least partially disposed in the housing, method comprising: displacing, with the first resilient element, the first pawl out of contact with the clutch gear; displacing, with the second resilient element, an end of the second pawl into contact with the clutch gear; blocking, with the second pawl, rotation of the clutch gear, with respect to the housing, in a first circumferential direction around an axis of rotation of the clutch gear; and rotating the clutch gear, with respect to the housing, in a second circumferential direction, opposite the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
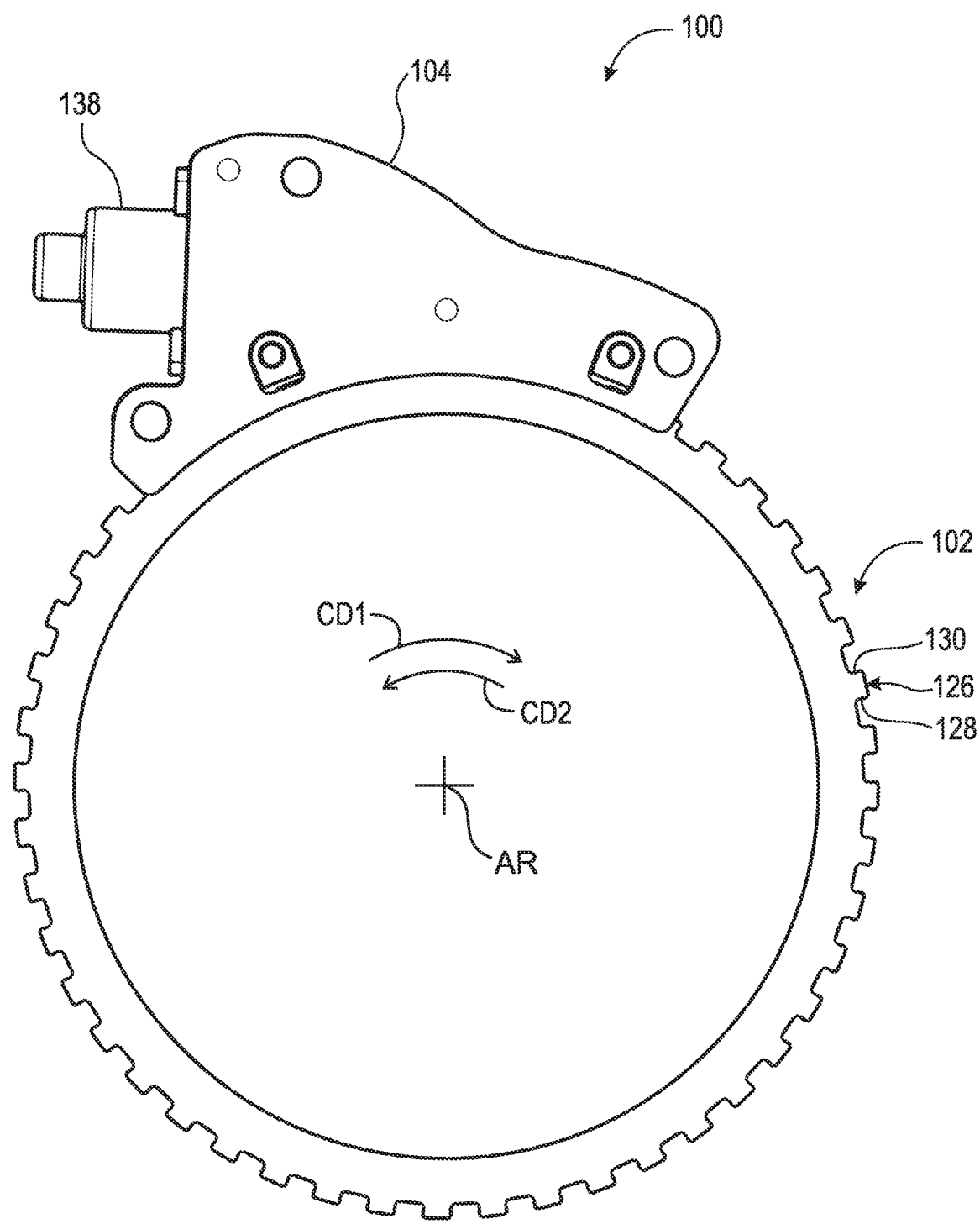
FIG. 1 is a front view of a two-mode rocker clutch.

FIG. 1 is a front view of two-mode rocker clutch 100.

Figure 2:
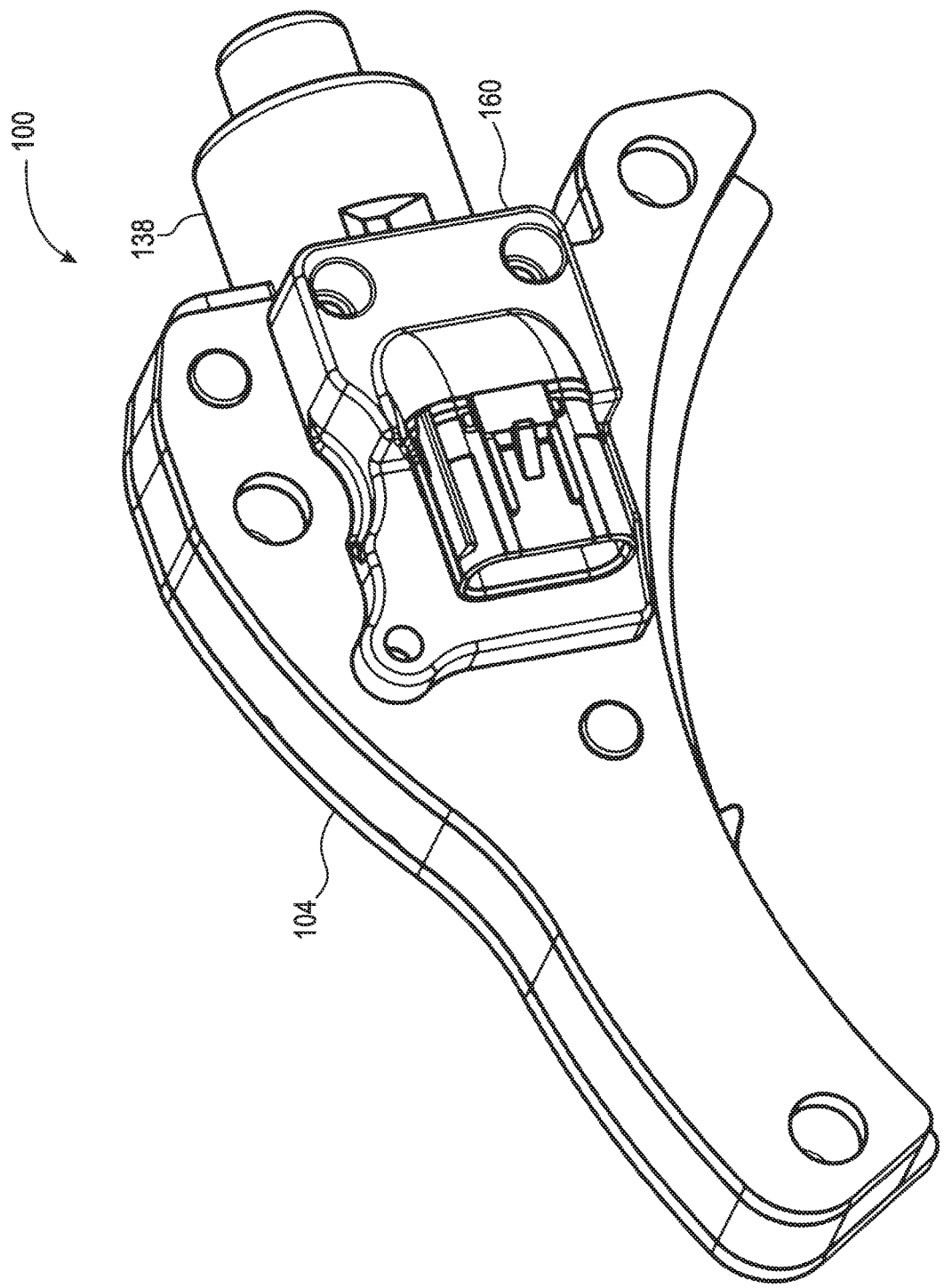
FIG. 2 is a rear isometric view of the two-mode rocker clutch shown in FIG. 1.

FIG. 2 is a rear isometric view of two-mode rocker clutch 100 shown in FIG. 1.

Figure 3:
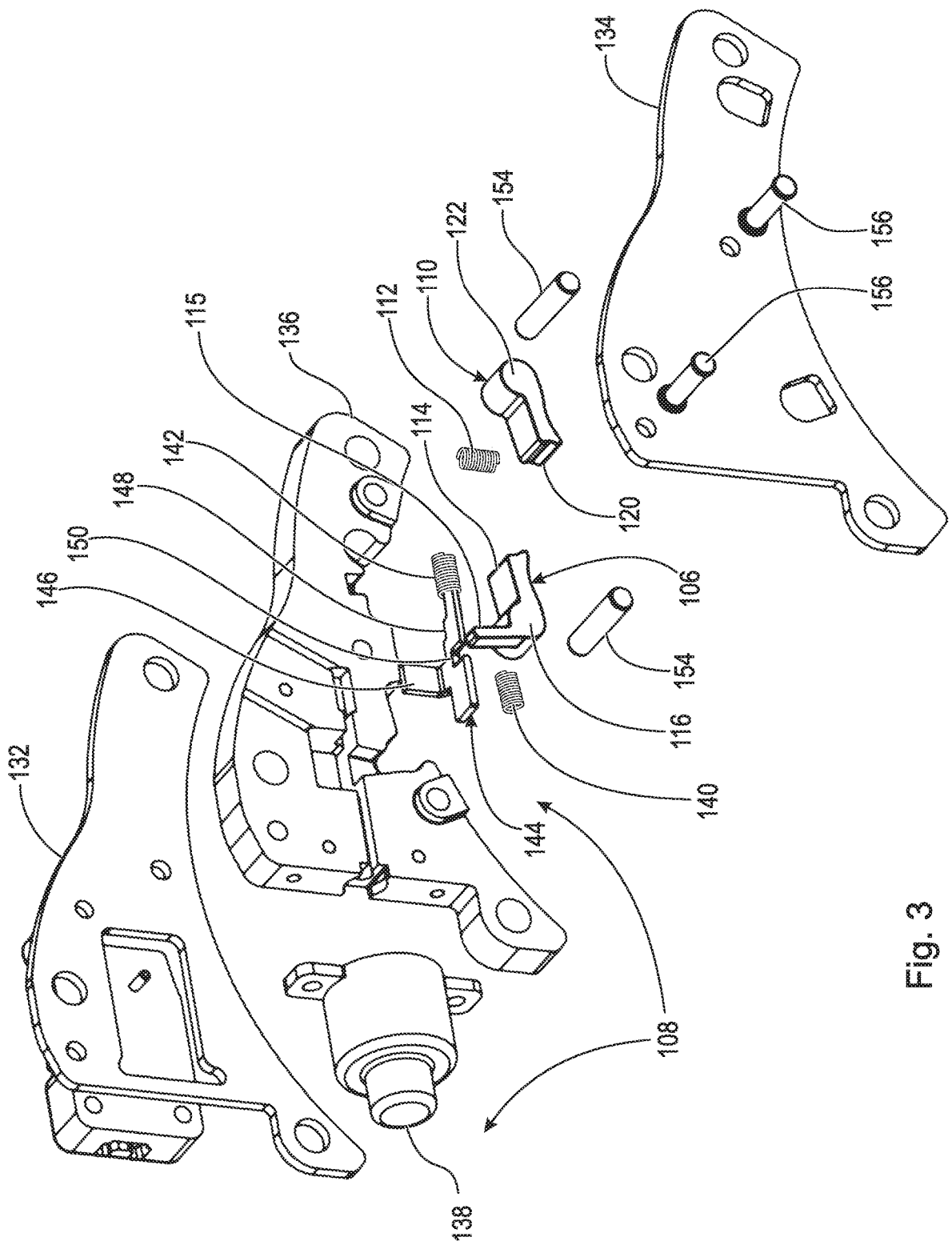
FIG. 3 is an exploded view of the two-mode rocker clutch shown in FIG. 1 without a clutch gear.

FIG. 3 is an exploded view of two-mode rocker clutch 100 shown in FIG. 1 without a clutch gear. The following should be viewed in light of FIGS. 1 through 3. Two-mode rocker clutch 100 includes: clutch gear 102 supported for rotation around axis of rotation AR; housing 104; pawl 106; actuation assembly 108; pawl 110; and resilient element 112. Pawl 106 includes end 114, end 115, and portion 116. End 115 and portion 116 are disposed in cavity 118 bounded by housing 104. Pawl 110 includes end 120 and portion 122 disposed in cavity 124 bounded by housing 104. Resilient element 112 urges pawl 110 in direction D1 around axis of pawl 110 and into contact with clutch gear 102. Pawl 106 is free of contact with pawl 110.

Clutch gear 102 includes radially outwardly extending teeth 126. Each tooth 126 includes: surface 128 facing in circumferential direction CD1 around axis of rotation AR; and surface 130 facing in circumferential direction CD2, opposite direction CD1. In the example of FIG. 1, housing 104 includes side panel 132, side panel 134, and central panel 136. Actuation assembly 108 includes solenoid 138, resilient element 140, and resilient element 142. Elements 140 and 142 are located within housing 104. In an example embodiment: two-mode rocker clutch 100 includes shuttle link 144 with tab 146 and portion 148 in contact with pawl 110 and resilient elements 140 and 142. Pawl 106 is disposed in slot 150 of shuttle link 144.

Figure 4:
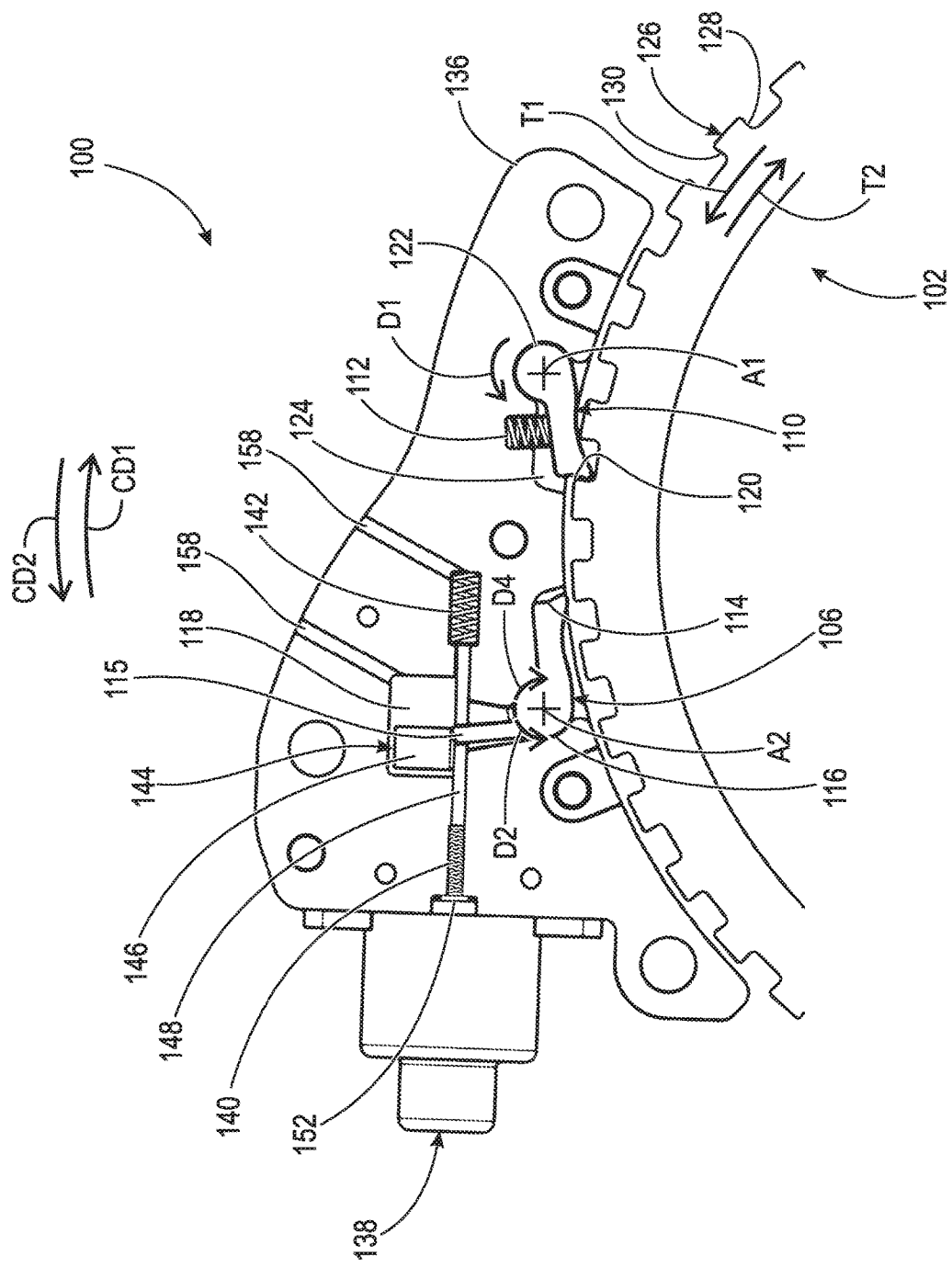
FIG. 4 is a view of the two-mode rocker clutch shown in FIG. 1 with a side panel removed and in a one-way mode.

FIG. 4 is a view of two-mode rocker clutch 100 shown in FIG. 1 with side panel 134 removed and in a one-way mode. The following should be viewed in light of FIGS. 1 through 4. For the one-way mode of two-mode rocker clutch 100: clutch gear 102 is rotatable, with respect to housing 104, only in circumferential direction CD2; pawl 110 blocks rotation of clutch gear 102, with respect to housing 104, in direction CD1; and pawl 106 is free of contact with clutch gear 102. For example: as clutch gear 102 rotates in direction CD2, pawl 110 passes over teeth 126 without contacting surfaces 128, enabling continued rotation of clutch gear 102 in direction CD2; and as clutch gear 102 rotates in direction CD1, with respect to housing 104, end 120 of pawl 110 contacts surface 128 of a tooth 126 to block further rotation of clutch gear 102, with respect to housing 104 and in direction CD1, around axis of rotation AR.

Figure 5:
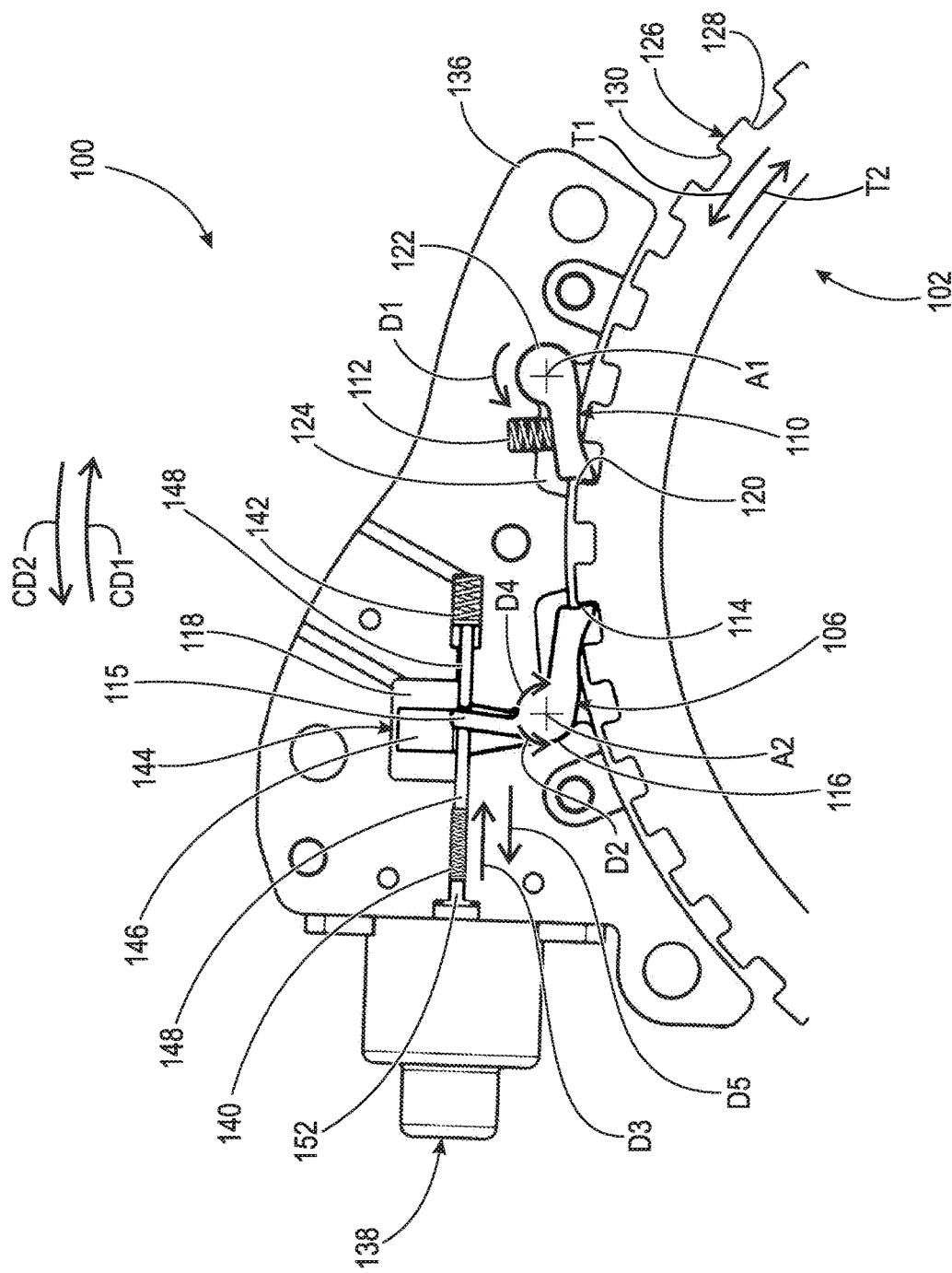
FIG. 5 is a cross-sectional view of the two-mode rocker clutch shown in FIG. 1 with the side panel removed and in a locked mode.

FIG. 5 is a view of two-mode rocker clutch 100 shown in FIG. 1 with side panel 134 removed and in a locked mode. The following should be viewed in light of FIGS. 1 through 5. For the locked mode of two-mode rocker clutch 100: pawl 106 contacts surface 130 of a tooth 126 to block rotation of clutch gear 102, with respect to housing 104, in direction CD2; and pawl 110 contacts surface 128 of a tooth 126 to block rotation of clutch gear 102, with respect to housing 104, in direction CD1.

Figure 6:
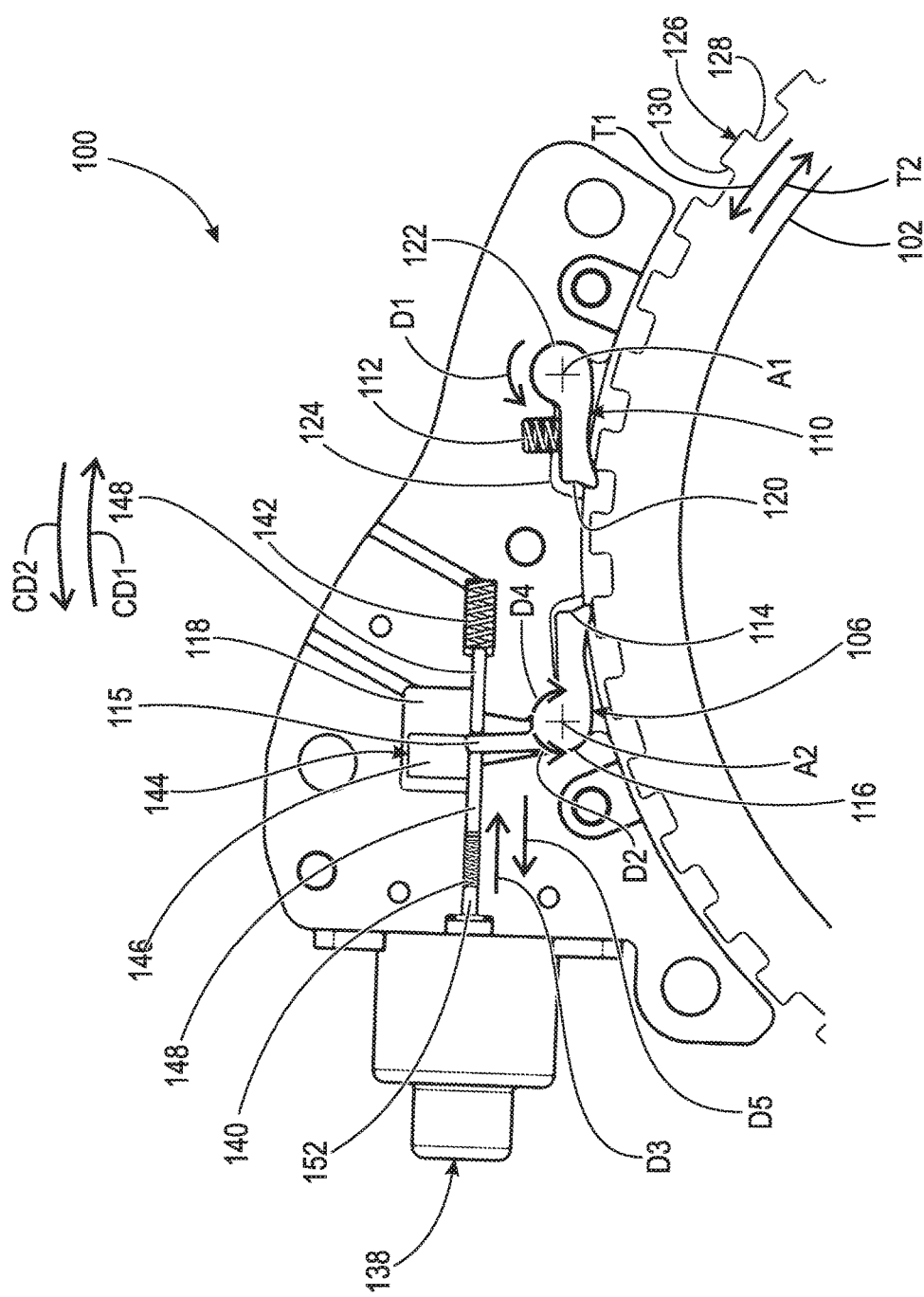
FIG. 6 is a cross-sectional view of the two-mode rocker clutch shown in FIG. 1 with the side panel removed and in a transition between the one-way mode and the locked mode.

FIG. 6 is a view of two-mode rocker clutch 100 shown in FIG. 1 with side panel 134 removed and in a transition between the one-way mode and the locked mode. The following should be viewed in light of FIGS. 1 through 6. In the example of FIG. 1, to transition from the one-way mode of FIG. 4 to the locked mode of FIG. 5, actuation assembly 108 is arranged to pivot pawl 106 in direction D2 around axis A2 of pawl 106 so that end 114 contacts clutch gear 102. For example: solenoid 138 displaces plunger 152 of solenoid 138 in direction D3; plunger 152 compresses resilient element 140 and displaces resilient element 140 in direction D3; resilient element 140 displaces shuttle link 144 in direction D3; and shuttle link 144 compresses resilient element 142, and pivots pawl 106 in direction D2 so that end 114 contacts a surface 130 for rotational torque T1 applied to clutch gear 102 in direction CD2. Resilient element 112 continues to urge pawl 110 in direction D1 so that end 120 contacts a surface 128 for rotational torque T2 applied to clutch gear 102 in direction CD1.

Pawl 110 is pivotable around axis A1 and pawl 106 is pivotable around axis A2. To transition from the locked mode of FIG. 5 to the one-way mode of FIG. 4, actuation assembly 108 is arranged to pivot pawl 106 in direction D4 around axis A2 of pawl 106 so that end 114 breaks contact with clutch gear 102. For example: solenoid 138 displaces plunger 152 of solenoid 138 in direction D5, opposite direction D3; resilient element 142 displaces shuttle link 144 in direction D5; shuttle link 144 pivots pawl 106 in direction D4; and shuttle link 144 compresses resilient element 140. Resilient element 112 continues to urge pawl 110 in direction D1 so that end 120 contacts a surface 128 for rotational torque T2 applied to clutch gear 102 in direction CD1.

In the example of FIG. 1, two-mode rocker clutch 100 includes: alignment pins 154 arranged to mount clutch 100, for example to a fixed component of a transmission (not shown); pins 156 connecting panels 132, 134, and 136; channels 158 for venting oil from cavity 118; and solenoid position sensor 160.

The following should be viewed in light of FIGS. 1 through 6. The following describes a method for operating a two-mode rocker clutch including a clutch gear, a housing, a first pawl at least partially disposed in the housing, a first resilient element, a second pawl at least partially disposed in the housing, and a second resilient element at least partially disposed in the housing. A first step displaces, with the first resilient element, the first pawl out of contact with the clutch gear. A second step displaces, with the second resilient element, an end of the second pawl into contact with the clutch gear. A third step blocks, with the second pawl, rotation of the clutch gear, with respect to the housing, in a first circumferential direction around an axis of rotation of the clutch gear. A fourth step receives a first rotational torque in a second circumferential direction, opposite the first circumferential direction. A fifth step rotates the clutch gear, with respect to the housing, in the second circumferential direction.

In an example embodiment, the two-mode rocker clutch includes a solenoid and: a sixth step displaces, with the solenoid, the first pawl into contact with the clutch gear; a seventh step blocks, with the first pawl, rotation of the clutch gear, with respect to the housing in the second circumferential direction.

In an example embodiment, the two-mode rocker clutch includes a third resilient element disposed between the solenoid and the first pawl, and displacing, with the solenoid, the first pawl into contact with the clutch gear includes: displacing, with the solenoid, the third resilient element; displacing, with the third resilient element, the first pawl into contact with the clutch gear; and compressing the first resilient element.

The novel configuration of two-mode rocker clutch 100 combines an always engaged one-way mode, using pawl 110 and resilient element 112, with pawl 106, controllable via actuation assembly 108, to provide a ratcheting clutch switchable between a one-way mode and a locked mode.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A1 axis, pawl 110
A2 axis, pawl 106
AR axis of rotation
CD1 circumferential direction
CD2 circumferential direction
D1 direction, axis A1
D2 direction, axis A2
D3 direction
D4 direction, axis A2
D5 direction
T1 rotational torque
T2 rotational torque
100 two-mode rocker clutch
102 clutch gear
104 housing
106 pawl
108 actuation assembly
110 pawl
112 resilient element 114 end, pawl 106
115 end, pawl 106
116 portion, pawl 106
118 cavity
120 end, pawl 110
122 portion, pawl 110
124 cavity
126 tooth
128 surface, tooth
130 surface, tooth
132 panel, housing
134 panel, housing
136 panel, housing
138 solenoid
140 resilient element
142 resilient element
144 shuttle link
146 tab, shuttle link
148 portion, shuttle link
150 slot, shuttle link
152 plunger, solenoid
154 alignment pin
156 pin
158 channel
160 solenoid position sensor

The invention claimed is:

1. A two-mode rocker clutch, comprising:
a clutch gear supported for rotation around an axis of rotation;
a housing;
a first pawl including:
an end; and,
a portion disposed within the housing;
an actuation assembly including a solenoid and a resilient element;
a second pawl including a portion disposed within the housing; and,
a resilient element urging the second pawl into contact with the clutch gear, wherein:
for a one-way mode of the two-mode rocker clutch, the clutch gear is rotatable, with respect to the housing, only in a first circumferential direction around the axis of rotation; and,
to transition from the one-way mode to a locked mode of the two-mode rocker clutch:
the second pawl blocks rotation of the clutch gear, with respect to the housing, in a second circumferential direction, opposite the first circumferential direction;
the solenoid is arranged to displace the resilient element of the actuation assembly;
the resilient element of the actuation assembly is arranged to pivot the first pawl into contact with the clutch gear; and,
the end of the first pawl is arranged to block rotation of the clutch gear, with respect to the housing, in the first circumferential direction.

2. The two-mode rocker clutch of claim 1, wherein to transition from the locked mode to the one-way mode, the actuation assembly is arranged to pivot the first pawl out of contact with the clutch gear.

3. The two-mode rocker clutch of claim 1, wherein the first pawl is free of contact with the second pawl.

4. The two-mode rocker clutch of claim 1, wherein:
the clutch gear includes a plurality of radially outwardly extending teeth;
each radially outwardly extending tooth includes:
a first surface facing in the first circumferential direction; and,
a second surface facing in the second circumferential direction; and,
to transition from the one-way mode to the locked mode:
the end of the first pawl is arranged to contact the first surface of a first radially outwardly extending tooth included in the plurality of radially outwardly extending teeth; and,
the second pawl is arranged to contact the second surface of a second radially outwardly extending tooth included in the plurality of radially outwardly extending teeth.

5. The two-mode rocker clutch of claim 1, wherein to transition from the one-way mode to the locked mode, the resilient element of the actuation assembly is arranged to pivot the end of the first pawl into contact with the clutch gear.

6. The two-mode rocker clutch of claim 1, further comprising:
a shuttle link disposed within the housing and in contact with the first pawl, wherein to transition from the one-way mode to the locked mode:
the solenoid is arranged to displace the shuttle link in a direction toward the first pawl; and,
the shuttle link is arranged to pivot the end of the first pawl into contact with the clutch gear.

7. The two-mode rocker clutch of claim 6, wherein:
the resilient element of the actuation assembly is in contact with the solenoid and the shuttle link; and,
to transition from the one-way mode to the locked mode:
the solenoid is arranged to displace the resilient element of the actuation assembly in the direction; and,
the resilient element of the actuation assembly is arranged to displace the shuttle link in the direction.

8. The two-mode rocker clutch of claim 1, wherein:
the solenoid includes a plunger;
the resilient element of the actuation assembly is disposed within the housing; and,
to transition from the locked mode to the one-way mode:
the solenoid is arranged to displace the plunger in a direction away from the resilient element of the actuation assembly; and,
the resilient element of the actuation assembly is arranged to pivot the end of the first pawl out of contact with the clutch gear.

9. The two-mode rocker clutch of claim 1, further comprising:
a shuttle link disposed within the housing and in contact with the first pawl, wherein:
the solenoid includes a plunger; and,
to transition from the locked mode to the one-way mode:
the solenoid is arranged to displace the plunger in a direction;
the resilient element of the actuation assembly is arranged to displace the shuttle link in the direction; and,
the shuttle link is arranged to pivot the end of the first pawl out of contact with the clutch gear.

10. A two-mode rocker clutch, comprising:
a clutch gear supported for rotation around an axis of rotation;
a housing;
a first pawl including:
an end; and,
a portion disposed within the housing;

a solenoid with a plunger;
a second pawl free of contact with the first pawl and including a portion disposed within the housing;
a first resilient element; and,
a second resilient element urging the second pawl into contact with the clutch gear, wherein:
in a one-way mode of the two-mode rocker clutch:
the clutch gear is rotatable, with respect to the housing, only in first circumferential direction around the axis of rotation; and,
the second pawl is arranged to block rotation of the clutch gear, with respect to the housing, in a second circumferential direction, opposite the first circumferential direction;
in a locked mode of the two-mode rocker clutch, rotation of the clutch gear, with respect to the housing, is blocked by the first pawl and the second pawl; and,
to transition from the one-way mode to the locked mode:
the solenoid is arranged to displace the plunger;
the plunger is arranged to displace the first resilient element toward the first pawl; and,
the first resilient element is arranged to pivot the first pawl into contact with the clutch gear.

11. The two-mode rocker clutch of claim 10, further comprising:
a shuttle link disposed within the housing and in contact with the first pawl, wherein to transition from the one-way mode to the locked mode:
the first resilient element is arranged to displace the shuttle link; and,
the shuttle link is arranged to pivot the first pawl into contact with the clutch gear.

12. The two-mode rocker clutch of claim 10, further comprising:
a third resilient element located within the housing, wherein to transition from the locked mode to the one-way mode, the third resilient element is arranged to pivot the first pawl out of contact with the clutch gear.

13. The two-mode rocker clutch of claim 10, further comprising:
a third resilient element located within the housing, wherein to transition from the locked mode to the one-way mode, the third resilient element is arranged to:
compress the first resilient element; and,
pivot the first pawl out of contact with the clutch gear.

14. The two-mode rocker clutch of claim 10, further comprising:
a third resilient element located within the housing; and,
a shuttle link disposed within the housing and in contact with the first pawl and with the third resilient element, wherein to transition from the locked mode to the one-way mode:
the third resilient element is arranged to displace the shuttle link; and,
the shuttle link is arranged to pivot the first pawl out of contact with the clutch gear.

15. The two-mode rocker clutch of claim 14, further comprising:
a third resilient element located within the housing, wherein:
the first pawl is pivotable around an axis;
the first resilient element urges the first pawl in a first direction around the axis; and,
the third resilient element urges the first pawl in a second direction, opposite the first direction.

16. A method of operating a two-mode rocker clutch including a clutch gear, a housing, a first pawl at least partially disposed in the housing, a solenoid, a first resilient element, a second pawl at least partially disposed in the housing, and a second resilient element at least partially disposed in the housing, method comprising:
displacing, with the first resilient element, the first pawl out of contact with the clutch gear;
displacing, with the second resilient element, an end of the second pawl into contact with the clutch gear;
blocking, with the second pawl, rotation of the clutch gear, with respect to the housing, in a first circumferential direction around an axis of rotation of the clutch gear;
rotating the clutch gear, with respect to the housing, in a second circumferential direction, opposite the first circumferential direction;
displacing with the solenoid, the first pawl into contact with the clutch gear;
blocking, with the first pawl, rotation of the clutch gear, with respect to the housing, in the second circumferential direction; and,
blocking, with the second pawl, rotation of the clutch gear, with respect to the housing, in the first circumferential direction.

17. The method of claim 16, wherein:
the two-mode rocker clutch includes a third resilient element disposed between the solenoid and the first pawl; and,
displacing, with the solenoid, the first pawl into contact with the clutch gear includes:
displacing, with the solenoid, the third resilient element;
displacing, with the third resilient element, the first pawl into contact with the clutch gear; and,
compressing the first resilient element.

* * * * *